April 25, 1961 S. HANSEN 2,981,843
STAR-TRACKING SYSTEM
Filed Sept. 2, 1947

INVENTOR.
SIEGFRIED HANSEN
BY Frank J. Epstein
HIS AGENT

United States Patent Office 2,981,843
Patented Apr. 25, 1961

2,981,843
STAR-TRACKING SYSTEM

Siegfried Hansen, Los Angeles, Calif., assignor, by mesne assignments, to Hughes Aircraft Company, a corporation of Delaware Filed Sept. 2, 1947, Ser. No. 771,762

14 Claims. (Cl. 250—203)

My invention relates to electro-optical or electro-quasi-optical apparatus and in particular to a telescopic star-tracking system.

It has become of importance, in the development of position-finding apparatus for use on aircraft of various types, to provide means capable of continuously and accurately determining the direction or line-of-sight to a stellar body. Prior telescopic apparatus fail to accomplish this under bright-sky conditions, primarily because of poor contrast of stars against their bright background fields as normally seen by a photo-responsive component of the apparatus.

It is therefore an object of the present invention to provide an electro-optical apparatus in which star images are discriminated against a bright-sky background field.

It is another object to provide an electro-optical system which automatically tracks a small object having a distinctive radiation characteristic.

It is a further object of the present invention to provide means for deriving a frequency-modulated signal which identifies the position of a small image in its background field.

These and other objects are attained by the means hereinafter described and illustrated in the accompanying drawing, in which.

Figure 1:
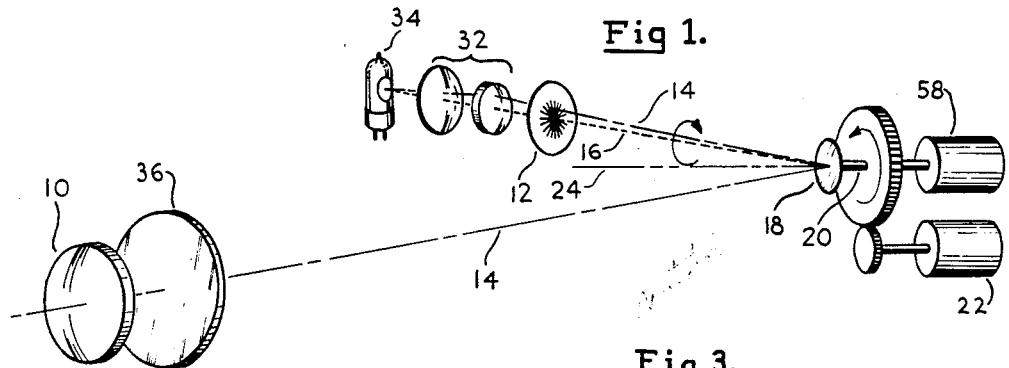
Fig. 1 is a diagrammatic perspective view of the novel electro-optical apparatus.

In accordance with the present invention, a selected star is in effect perceived in or discriminated against a bright-sky background, and information is derived as to the location of the star in its background field. Both of these important features basically depend upon the use of a screen or diaphragm having a series of narrow apertures, and upon movement of a field image relative thereto. The invention may be best understood by reference to a specific embodiment as here illustrated. Referring first to Fig. 1, a sighting structure having a telescopic lens system including an objective lens 10 is adapted to be pointed toward a selected stellar body by conventional electro-mechanical means not here shown. The field image formed by the telescopic lens system is projected against a diaphragm 12 having an aperture pattern later described in detail. A circular translational motion is imparted to the field image relative to diaphragm 12 so that any star image in the field traces a circle upon the diaphragm. In the illustrated embodiment, this is accomplished by causing that portion of optical axis 14 which strikes diaphragm 12, and its accompanying cone of rays which form the image, to nutate about a central axis 16 extending through diaphragm 12. The nutating motion is here produced by a rotating mirror 18 which is positioned to direct light from objective lens 10 to diaphragm 12. Mirror 18 is so mounted upon and rotated by shaft 20, geared to a motor 22, that its reflecting surface is tilted to a small extent from perpendicularity to its axis of rotation 24. The orientation of mirror 18 relative to objective lens 10 thus varies continuously during a revolution of shaft 20, and causes the field image projected against diaphragm 12 to move relative thereto with the desired circular translational motion.

Figure 2:
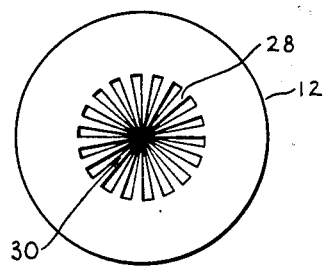
Fig. 2 is an apertured diaphragm utilized in the subject apparatus.

A preferred pattern of apertures in diaphragm 12 is indicated in Fig. 2. For convenience of illustration, the diaphragm 12 is here shown provided with a circle of but a relatively small number of apertures 28. The apertures extend radially from the diaphragm center 30, are each sectoral in form, and are separated by opaque areas of equal angular width. In actual practice, a much larger number of such apertures or light-transparent strips are provided, for each may be sufficiently narrow to hardly more than encompass a star image, and because greater discrimination is obtained with an increased number of apertures. Stars are at distances from earth measured in terms of light-years, distances comparatively so great that a star may be regarded as an ideal point source of light. A star image is therefore limited in minuteness only by the resolution of the telescope objective or collective member, and a diaphragm having a relatively large number of narrow apertures can be used. In a typical instance, for use with a telescopic lens system forming a field image of approximately 3/10 inch diameter, there may be provided a diaphragm having 90 such apertures, each approximately 1/10 inch long as measured from the diaphragm center, each aperture thus having a mean width less than 2 mils.

Referring again to Fig. 1, a condenser lens system 32 directs light to a phototube 34 from those field image areas projected against the light-transparent strips of diaphragm 12. Associated with phototube 34 is a conventional phototube amplifier circuit, here not shown, which translates only the rapid fluctuations of light impinging upon the phototube into a corresponding electrical signal, hereinafter termed an image signal. For reasons which will appear, this image signal bears frequency modulation characteristics which are correlated to the position of the star image in the telescopic field, and therefore to the pointing error of the sighting structure.

Because of the discrete or discriminate series of apertures in diaphragm 12 against which the field image is projected, and the movement of the field image relative to the diaphragm, the illumination reaching phototube 34 includes rapidly recurrent pulses of star-light, to which the phototube circuit is highly responsive, and a certain amount of sky-light whose normally adverse effect is reduced in this apparatus. The illumination due to the background sky is substantially uniform over the field image, so that very little of the variation in light striking phototube 34 is attributable to movement of the sky image itself over the diaphragm. While a star image appears poorly visible against a bright-sky background, it possesses a luminosity gradient which is enormous in comparison with its background field. The light fluctuations reaching phototube 34 are thus due principally to intermittent passage of star-light through the light-transparent strips of the diaphragm.

For the purpose of initially increasing the contrast between a selected star and its bright-sky background, an infra-red filter 36 is included in the lens system. Most stars have a spectral distribution which does not favor the blue region, while the background sky illumination, produced by scattering of light in the dust and gases of the atmosphere, is a function of wavelength and is strongest at the blue end of the spectrum. Operation in the red or infra-red region of the spectrum therefore considerably improves the contrast of the star image against its background and increases the intensity variation of light directed to phototube 34.

Figure 3:
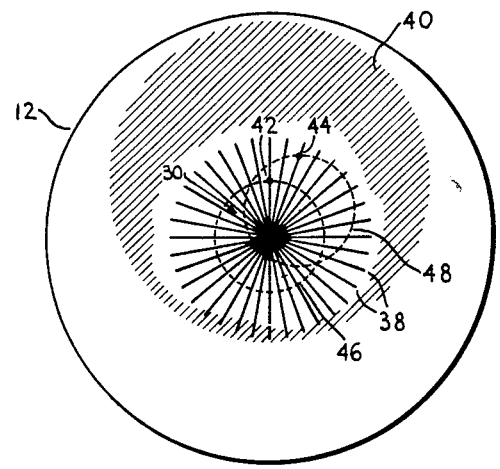
Fig. 3 illustrates the relative position of a telescopic field image projected against the apertured diaphragm.

The manner in which the frequency modulation characteristic is produced may be understood by reference to Fig. 3, in which the field image projected against diaphragm 12 by the sighting structure is shown in an instantaneous position by the shaded area 40. The apertures in diaphragm 12 are here represented by the dark narrow lines 38 extending radially from the diaphragm center 30, and again, for ease of illustration, there is shown a smaller number of apertures than later recited in a specific example. The relative circular translational motion between the field image 40 and the diaphragm 12 causes all points in the field image to describe circles of equal and fixed radius upon the diaphragm. The field image center 42, or a small image formed at that point, traces a circular path 46 which is concentric with center 30 of the diaphragm 12. Any other point or small image 44 in field 38 describes an equal circle which is eccentric to diaphragm center 30. Thus, when the sighting structure is trained with zero pointing error upon a selected star, the star image is formed at field image center 42 and traces the path 46 as shown. Since this image path is concentric to diaphragm center 30, the star image encounters the apertures at a repetition rate which is constant during a cycle of its displacement. A star image formed at any other point 44, however, traces an equal-sized circular path 48 which is eccentric to diaphragm center 30 and therefore traverses apertures 38 at a repetition frequency which varies during a given cycle. In a specific instance, diaphragm 12 may have 90 apertures as described above, and the apparatus may be designed to move field image 40 at a rate of one-half revolution per second (30 r.p.m.) about the diaphragm center 30. At such a scanning rate, the star image signal has an average or carrier frequency of 45 cycles per second, and is frequency modulated above and below this value at a ½ cycle per second rate to an extent dependent upon the departure of the star image from a central position in the field image. The total deviation of this frequency modulated signal is thus a function of the sighting error angle or departure of the telescopic sighting axis from the line-of-sight to the selected star; the relative phase of the frequency-modulation component is a function of the direction in which the star image departs from the central position in the field image, corresponding to the direction in which the sighting axis departs from the line-of-sight.

Figure 4:
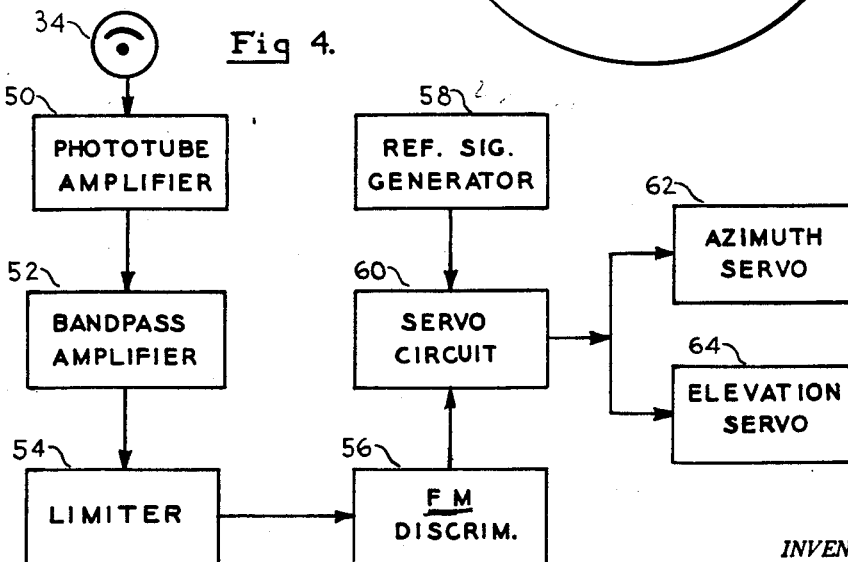
Fig. 4 is a block diagram of a circuit for deriving and utilizing pointing error signals.

The frequency-modulation component of the image signal is thus an error signal identifying the optical pointing error of the sighting structure, and may be utilized for automatically and continuously correcting the orientation of the sighting structure to keep it trained upon a selected stellar body. A circuit for accomplishing this is shown in block diagram form in Fig. 4, each component therein being well known in the art. The intensity variation of light striking phototube 34, principally due to starlight pulses, is converted to a corresponding image signal by phototube amplifier circuit 50. As has been described, the diaphragm aperture pattern and the relative motion of the field image impart frequency modulation characteristics to the image signal which identify the pointing error of the sighting structure. In order to suppress or eliminate any spurious components produced by the action of the diaphragm as a whole upon the sky field image, the image signal is applied to a band-pass amplifier 52 designed to accommodate only the frequency spectrum of the star image signal. In the specific instance wherein there are 90 apertures and the relative motion of the field image takes place at ½ c.p.s., the carrier frequency is 45 cycles per second. The band-pass amplifier may here, for example, be designed to amplify over a 30 to 90 c.p.s. frequency band, from which any ½ c.p.s. fundamental component is sufficiently removed in frequency to be effectively eliminated.

Amplitude-modulation of the star image signal is eliminated by action of a limiter circuit 54, and as a result the signal to noise ratio is improved, false signals due to weaker stars lying near the selected star are suppressed, and the gain of the system is made independent of star brightness. The amplitude-limited signal output of limiter 54 is applied to an FM discriminator 56 which in effect detects or isolates the modulation component as a ½ c.p.s. A.-C. voltage proportional to the frequency deviation of the frequency modulated signal. The A.-C. output of discriminator 56 is the pointing error signal, possessing an amplitude and relative phase corresponding to the magnitude and direction, respectively, of the sighting axis pointing error.

The sighting axis is conveniently oriented by conventional mechanisms, comprising servomotors and gearing, which drive the sighting structure in azimuth and elevation through angles dependent upon applied electrical control information. The control information is here derived from the pointing error signal, and from reference signals synchronized with the displacement of the image field. Such reference signals are provided by a two-phase generator 58 directly coupled to mirror shaft 20 as indicated in Fig. 1. Referring again to Fig. 4, the pointing error signal output of discriminator 56 and the quadrature reference signals from generator 58 are applied to a servo circuit 60, in which phase detectors abstract the azimuth and elevation error components of the pointing error signal, and in which corresponding control voltages are produced. These control voltages are applied to azimuth and elevation servos 62 and 64, respectively, and the sighting structure is thus automatically, continuously and accurately trained upon the selected stellar body.

Diaphragm 12 may conveniently be provided by the procedure of making, to greatly enlarged scale, a diaphragm drawing having darkened strips corresponding to the light-transparent areas of the diaphragm, photographing the diaphragm drawing at a suitable distance, and processing the photographic film. There is thus secured a negative, having accurately formed light-transparent areas, which serves admirably as the diaphragm. For infra-red operation as here described, a phototube such as the lead sulphide photoconductive cell may be utilized, together with an optical filter such as that commercially identified as the Wratten 88–A.

The diaphragm may have other than uniform, radial, sectoral apertures formed therein, for while such apertures are at present considered preferable, the invention is not limited thereto. Similarly, while the invention has been described in an embodiment capable of tracking stellar bodies under either bright or dark-sky conditions, it may be designed and utilized to seek, home upon, or track many other objects having luminosity gradients differing from that of their background fields, or having distinctive radiation characteristics. Surface or air craft are suitable examples of such objects, for they generally possess areas of intra-red radiation which provide suitably distinct images. Further, while the invention has been described with particular reference to an apparatus in which the image forming and scanning means operate in the luminous or infra-red regions, it is apparent that the invention may be practiced with equivalent apparatus designed for use with objects illuminated or identified by extremely short radio waves or other quasi-optical radiant energy.

It is thus to be understood that while a particular construction and arrangement of apparatus relating to a star-tracking embodiment of the invention has been described, various modifications and other uses may be made which nevertheless lie within the spirit and scope of the invention as defined by the appended claims.

I claim:
1. An electro-optical system, comprising a diaphragm having substantially radial light-transparent strips extending from a central point, means for projecting a small image included in a background field against said diaphragm, means for producing relative circular translational motion between said field and said diaphragm such that a reference point of said background field describes a circular path concentric to said diaphragm central point, said image thereby describing a circular path eccentric to said diaphragm central point by an amount and in a direction corresponding to the position of said image relative to said field reference point, whereby said diaphragm passes illumination fluctuations due to traversal of said light-transparent strips by said small image, means for translating said illumination fluctuations into a corresponding image signal having characteristics corresponding to said eccentricity, and means for deriving image position information from said image signal.

2. A star-tracking apparatus, comprising: a diaphragm member containing narrow, elongated areas having a distinctive response to radiant flux impinging thereon, said areas extending radially from and spaced uniformly about a central point in said member; optical means for projecting against said member an image of a field of view encompassing a stellar body, the projected field having a reference point therein representing the sighting axis of said optical means, the amplitude and direction of displacement of said imaged stellar body relative to said field reference point corresponding to the training error of said sighting axis; servo means for orienting said sighting axis; means for producing a cyclic translational movement of said projected field relative to said diaphragm member such that said imaged stellar body repetitively traces upon said member a circular path having an eccentricity, relative to said central point, corresponding to said displacement, whereby the frequency at which registry of said imaged stellar body with said elongated areas takes place is correspondingly modulated; means for converting registrations of said imaged stellar body with said distinctive response areas into corresponding star-signal pulses; means for generating reference signals synchronized with said cyclic translation; circuit means for deriving, from said reference signals and said frequency-modulated star-signal pulses, error signals corresponding to said training error; and means for controlling said servo means in accordance with said error signals to continuously and accurately train said sighting axis upon said stellar body.

3. An electro-optical apparatus, comprising: a diaphragm member containing narrow, elongated areas having a distinctive response to radiant flux impinging thereon, said areas extending radially from and spaced uniformly about a central point in said member; optical means for projecting against said member an image of a field of view encompassing a relatively small source of radiant flux, the projected field having a reference point therein representing the sighting axis of said optical means, the amplitude and direction of displacement of said imaged source relative to said field reference point corresponding to the training error of said sighting axis; servo means for orienting said sighting axis; means for producing a cyclic translational movement of said projected field relative to said diaphragm member such that said imaged source repetitively traces upon said member a circular path having an eccentricity, relative to said central point, corresponding to said displacement, whereby the frequency at which registry of said imaged source with said elongated areas takes place is correspondingly modulated; means for converting registrations of said imaged source with said distinctive response areas into corresponding signal pulses; means for generating reference signals synchronized with said cyclic translation; circuit means for deriving, from said reference signals and said frequency-modulated signal pulses, error signals corresponding to said training error; and means for controlling said servo means in accordance with said error signals to continuously and accurately train said sighting axis upon said source of radiant flux.

4. An electro-optical apparatus, comprising: a diaphragm member containing narrow, elongated areas having a distinctive response to radiant flux impinging thereon, said areas extending radially from and spaced uniformly about a central point in said member; optical means for projecting against said member an image of a field of view encompassing a relatively small source of radiant flux, the projected field having a reference point therein representing the sighting axis of said optical means, the amplitude and direction of displacement of said imaged source relative to said field reference point corresponding to the training error of said sighting axis; means for producing a cyclic translational movement of said projected field relative to said diaphragm member such that said imaged source repetitively traces upon said member a circular path having an eccentricity, relative to said central point, corresponding to said displacement, whereby the frequency at which registry of said imaged source with said elongated areas takes place is correspondingly modulated; means for converting registrations of said imaged source with said distinctive response areas into corresponding signal pulses; means for generating reference signals synchronized with said cyclic translation; and circuit means utilizing said reference signals and said frequency-modulated signal pulses to provide position signals corresponding to and defining said training error.

5. An electro-optical apparatus, comprising: a diaphragm member containing narrow, elongated areas having a distinctive response to radiant flux impinging thereon, said areas extending radially from and spaced uniformly about a central point in said member; optical means for projecting against said member an image of a field of view encompassing a stellar body, the projected field having a reference point therein representing the sighting axis of said optical means, the amplitude and direction of displacement of said imaged stellar body relative to said field reference point corresponding to the training error of said sighting axis; means for producing a cyclic translational movement of said projected field relative to said diaphragm member such that said imaged stellar body repetitively traces upon said member a circular path having an eccentricity, relative to said central point, corresponding to said displacement, whereby the frequency at which registry of said imaged stellar body with said elongated areas takes place is correspondingly modulated; means for converting registrations of said imaged stellar body with said distinctive response areas into corresponding star-signal pulses; means for generating reference signals synchronized with said cyclic translation; circuit means for deriving, from said reference signals and said frequency-modulated star-signal pulses, position signals corresponding to and defining said training error; and utilization means responsive to said position signals.

6. An electro-optical apparatus, comprising: a diaphragm member containing narrow, elongated areas having a distinctive response to radiant flux impinging thereon, said areas extending radially from and spaced uniformly about a central point in said member; optical means for projecting against said member an image of a field of view encompassing a relatively small source of radiant flux, the projected field having a reference point therein representing the sighting axis of said optical means, the amplitude and direction of displacement of said imaged source relative to said field reference point corresponding to the training error of said sighting axis; means for producing a cyclic translational movement of said projected field relative to said diaphragm member such that said imaged source repetitively traces upon said member a circular path having an eccentricity, relative to said central point, corresponding to said displacement, whereby the frequency at which registry of said imaged source with said elongated areas takes place is correspondingly modulated; means for converting registrations of said imaged source with said distinctive response areas into corresponding signal pulses; means for generating reference signals synchronized with said cyclic translation; circuit means for deriving, from said reference signals and said frequency-modulated signal pulses, position signals corresponding to and defining said training error; and utilization means responsive to said position signals.

7. An electro-optical system for discriminating a small image from its background field, comprising: a diaphragm having elongated areas of distinctive response to radiant flux, said areas diverging as spokes from a common point in said diaphragm; means for projecting said field against said diaphragm; and means for imparting relative motion between said field and said diaphragm of such character as to produce registration of said small image with said areas at a repetition frequency which is modulated in accordance with divergence of said small image from a normal position in the background field.

8. An electro-optical system comprising: a diaphragm having areas of distinctive response to impinging radiant flux, said areas being arranged in a configuration yielding multi-cyclic character to said response as measured in any circular path concentric to a substantially central point in said diaphragm; means for projecting against said diaphragm a field of view encompassing a relatively small region of interest characterized by a radiation intensity differing from that of adjoining regions in said field; means producing relative translational motion between said field and said diaphragm of such a character that a reference point in said field traces a circular path concentric to said diaphragm central point, said small region of interest thereby tracing a circular path, upon said diaphragm, eccentric to said central point by an amount and in a direction corresponding to the displacement of said small region of interest relative to said reference point, whereby said small region of interest comes into registry with said areas of distinctive response at a frequency which is modulated in accordance with said displacement; and means translating said modulated frequency of registration into electrical signals having characteristics corresponding to said displacement.

9. An electro-optical system comprising a diaphragm having areas of distinctive response to impinging radiant flux, said areas being arranged in a configuration yielding multi-cyclic character to said response as measured in any circular path concentric to a substantially central point in said diaphragm; means for projecting against said diaphragm a field of view encompassing a relatively small region of interest characterized by a radiation intensity differing from that of adjoining regions in said field; means producing relative translational motion between said field and said diaphragm of such a character that a reference point in said field traces a circular path concentric to said diaphragm central point, said small region of interest thereby tracing a circular path, upon said diaphragm, eccentric to said central point by an amount and in a direction corresponding to the displacement of said small region of interest relative to said reference point, whereby said small region of interest comes into registry with said areas of distinctive response at a frequency which is modulated in accordance with said displacement; means translating said modulated frequency of registration into electrical signals having characteristics corresponding to said displacement; and utilization means responsive to said electrical signals.

10. An electro-optical apparatus comprising: a sighting structure; means for pointing said sighting structure toward an object of interest; means for converting the training error of said sighting structure to a frequency-modulated signal in which the extent of frequency variation and the phase of the frequency variation waveform are dependent upon the magnitude and direction, respectively, of said training error; band-pass amplifier means for accepting and amplifying only said frequency-modulated signal; means for deriving, from said amplified frequency-modulated signal, the modulation component possessing amplitude and phase characteristics corresponding to said magnitude and direction, respectively, of said training error; a source of quadrature reference signals having the same frequency as said frequency variation waveform; means for deriving, from said modulation component and said quadrature reference signals, control signals corresponding to coordinate components of said training error; and utilization means responsive to said control signals.

11. An electro-optical apparatus comprising: a sighting structure; means for pointing said sighting structure toward an object of interest; means for converting the training error of said sighting structure to a frequency-modulated signal in which the extent of frequency variation and the phase of the frequency variation waveform are dependent upon the magnitude and direction, respectively, of said training error; means for deriving, from said frequency-modulated signal, the modulation component possessing amplitude and phase characteristics corresponding to said magnitude and direction, respectively, of said training error; and means utilizing said modulation component to provide position signals corresponding to and defining said training error.

12. An apparatus comprising: means for converting a pair of coordinate components of a condition having vectorial characteristics into a frequency-modulated signal in which the extent of frequency variation and the phase of the frequency variation waveform correspond to said coordinate components; means for deriving from said frequency-modulated signal, the modulation component possessing amplitude and phase characteristics respectively corresponding to said extent of frequency variation and to said frequency variation waveform phase; and means utilizing said modulation component to provide a pair of signals corresponding to and defining said condition.

13. A position-finding system, including an optical system having an optical axis and having a field of view normally pointing toward a stellar object, a diaphragm included in the optical path of said optical system and transmitting variable degrees of impinging light to the remaining portion of said optical system, a rotatable reflecting surface in said optical system for intercepting the light coming from said field of view and reflecting said light on said diaphragm, said variable degree of light transmission causing a variable frequency light output in response to the light transmitted by said transmitting surface when the position of said stellar object is other than upon the axis of said optical system; means for converting said variable frequency light signal into a variable frequency electrical signal, and means for training said optical system directly upon said stellar object in response to said variable frequency electrical signal.

14. A position-finding system including an optical system having a field of view and an optical axis, said field of view normally pointing at a field including a stellar object, said optical system having scanning means to generate a variable frequency light signal when said stellar object is in any other position within said field of view than on said optical axis; illumination conversion means in light intercepting relationship with respect to said variable frequency light signal, said conversion means translating said variable frequency light signal into a variable frequency electrical signal, a frequency-sensitive circuit connected to said conversion means, and servo means connected to said circuit for training the optical axis of said optical system directly upon said stellar object in response to said variable frequency electrical signal.

References Cited in the file of this patent

UNITED STATES PATENTS 2,090,713 Wilson _____ Aug. 24, 1937
2,155,402 Clark _____ Apr. 25, 1939
2,412,612 Godet _____ Dec. 17, 1946
2,424,193 Rost et al. _____ July 15, 1947
2,444,933 Jasperson _____ July 13, 1948

FOREIGN PATENTS 33,746 Netherlands _____ Oct. 15, 1934